United States Patent
Reyes et al.

(10) Patent No.: US 7,447,806 B2
(45) Date of Patent: Nov. 4, 2008

(54) METHOD AND APPARATUS FOR CENTRALIZATION CONFIGURATION OF DATA PROCESSING SYSTEMS

(75) Inventors: Eduardo Lazaro Reyes, Austin, TX (US); Vasu Vallabhaneni, Austin, TX (US); Patrick Tam Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 11/232,762

(22) Filed: Sep. 22, 2005

(65) Prior Publication Data

US 2007/0067500 A1    Mar. 22, 2007

(51) Int. Cl.
*G06F 3/00* (2006.01)
*G06F 13/00* (2006.01)

(52) U.S. Cl. .............................. 710/8; 710/10; 710/15; 710/17

(58) Field of Classification Search ....................... None
See application file for complete search history.

(56) References Cited

U.S. PATENT DOCUMENTS

| | | | |
|---|---|---|---|
| 6,108,712 A | 8/2000 | Hayes, Jr. | |
| 6,209,031 B1 | 3/2001 | Casey et al. | |
| 6,487,601 B1 | 11/2002 | Hubacher et al. | |
| 6,810,478 B1 | 10/2004 | Anand et al. | |

OTHER PUBLICATIONS

U.S. Appl. No. 09/732,484, filed Dec. 7, 2000, Dutta et al.
U.S. Appl. No. 09/821,584, filed Mar. 29, 2001, Alessandri et al.
"Dynamic Host Configuration Protocol", Wikipedia, pp. 1-4.
"Installation Guide and Reference—NIM Networks", pp. 1-4.
"Dynamic host Configuration Protocol", Dynamic host Configuration Protocol Technology Center, pp. 1-2.
"Step-by-Step Guide to Remote OS Installation", Microsoft Windows 2000, Microsoft Corportion 2005, pp. 1-25.

*Primary Examiner*—Tariq R. Hafiz
*Assistant Examiner*—Scott Sun
(74) *Attorney, Agent, or Firm*—Duke W. Yee; Marilyn S. Dawkins; Theodore D. Fay, III (57) ABSTRACT

A computer implemented method, apparatus, and computer usable program code for configuring a remote data processing system. A configuration is identified for the remote data processing system to form an identified configuration. The hardware for the remote data processing system is configured. An installation application is sent to the remote data processing system across a communications link after the hardware in the remote data processing system has been configured, wherein the installation application executes on the remote data processing system to configure the remote data processing system. Installation files are sent across the communications link to the installation application executing on the remote data processing system. The installation program uses the installation files to configure install a set of operating systems, install applications, and configure software on the remote data processing system.

3 Claims, 6 Drawing Sheets

METHOD AND APPARATUS FOR CENTRALIZATION CONFIGURATION OF DATA PROCESSING SYSTEMS

BACKGROUND OF THE INVENTION

1. Field of the Invention

The present invention relates generally to an improved data processing system and in particular to a computer implemented method and apparatus for managing data processing systems. Still more particularly, the present invention relates to a computer implemented method, apparatus, and computer usable program code for centrally managing data processing systems in a network.

2. Description of the Related Art

In today's computing environments, virtualization is becoming more and more common. Virtualization involves pooling of information technology resources in a manner that shields the physical nature and boundaries of resources from users. This type of environment includes logical partitioning to make a server run as if that server was two or more independent servers. A user would see the single physical machine as two or more independent servers. When a server is logically partitioned, the resources are divided into subsets called logical partitions. The processor, memory, and input/output devices are examples of resources that may be assigned to logical partitions. An operating system may be installed on the disk drives, such that each logical partition runs as an independent server with the processor, memory, and input/output resources allocated to the partition.

Configuring these types of computer systems with dynamically customizable hardware resources currently requires a system administrator to configure and maintain these configurations. The elements in configuring logical partitioned (LPAR) systems include, but are not limited to, network information, the size and amount of disks which may be physical or virtual, and Ethernet adapters. The network configuration information includes, for example, the Internet protocol (IP) address, a subnet mask, and a default gateway. Ethernet adapters are examples of input/output devices that include their own configuration information, such as part of the virtual local area network (VLAN) to which they belong. The configuration of some of these elements are made easier by certain currently available tools, such as a dynamic host configuration protocol (DHCP) server, IP configuration, or a network installation manager (NIM) for network installation of operating systems remote software customization and system management.

These tools currently require an administrator to connect to the system being configured or managed through a hardware management console (HMC). A hardware management console is a hardware appliance that connects to the server firmware. This terminal allows an administrator to make hardware configurations, install operating systems, applications, and configure software for the LPAR data processing system. Further, with the availability of these remote tools, these tools may be able to aid an administrator in controlling configuration but are disparate and are not easily interoperable with each other. As a result, a large number of tools are present that a system administrator is required to master to configure these LPAR data processing systems and other systems with customizable hardware resources. As a result, the complexity in configuring and managing these systems increases.

SUMMARY OF THE INVENTION

The present invention provides a computer implemented method, apparatus, and computer usable program code for configuring a remote data processing system. A configuration is identified for the remote data processing system to form an identified configuration. The hardware for the remote data processing system is configured. An installation application is sent to the remote data processing system across a communications link after the hardware in the remote data processing system has been configured, wherein the installation application executes on the remote data processing system to configure the remote data processing system. Installation files are sent across the communications link to the installation application executing on the remote data processing system. The installation program uses the installation files to configure install a set of operating systems, install applications, and configure software on the remote data processing system.

The installation files may comprise operating system files, application files, and software configuration information. Also, the remote data processing system may be configured as a logical partitioned data processing system.

The steps for sending the installation application and the installation files may be implemented in a server data processing system. The configuration may be identified by receiving a selection of the configuration from a plurality of configurations. In one aspect of the present invention, the remote data processing system is reconfigured from a prior configuration to the configuration identified for the remote data processing system.

In another aspect of the present invention, the hardware may be configured by identifying hardware configuration information based on the identified configuration to form an identified hardware configuration; and sending the identified hardware configuration information across a communications link to a hardware configurations system. The hardware configurations system configures the hardware for the remote data processing system using the identified hardware configuration information. The hardware configuration system may be, for example, a computer assembly plant. In yet another aspect of the present invention, the hardware configuration system comprises hardware and software used to assign hardware in the remote data processing system to a plurality of partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
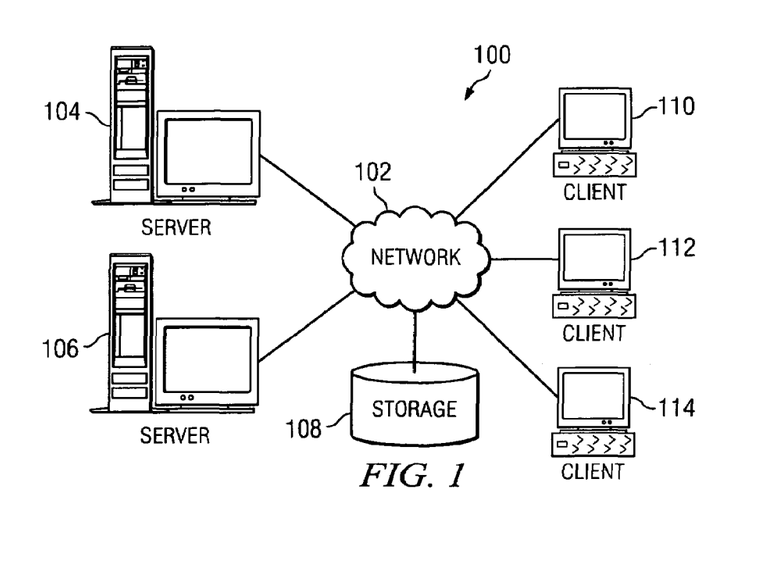
FIG. 1 is a pictorial representation of a network of data processing systems in which aspects of the present invention may be implemented.
Figure 2:
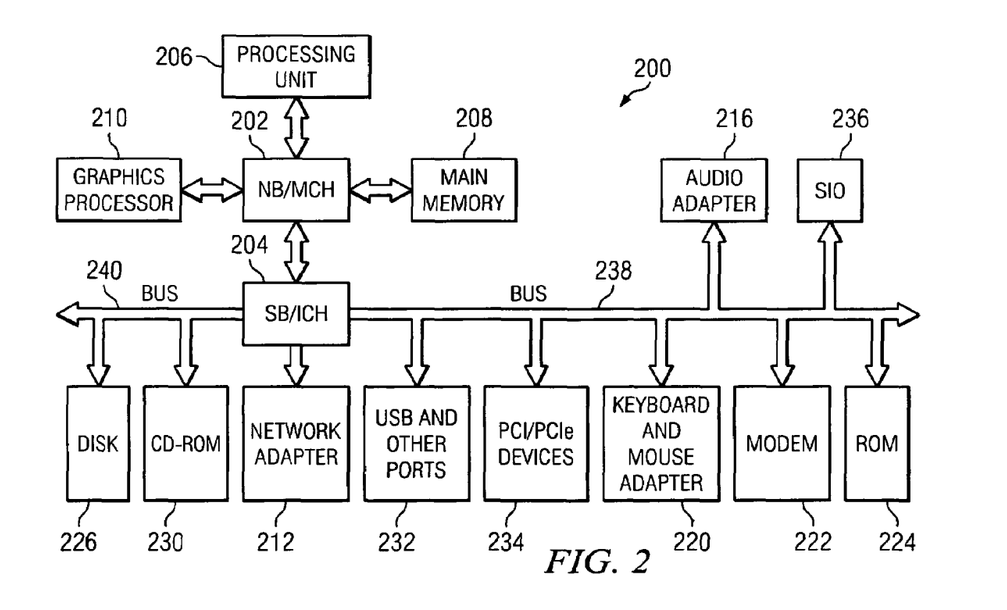
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pseries® computer system, running the Advanced Interactive Executive (AIX®) operating system or LINUX operating system (eserver, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
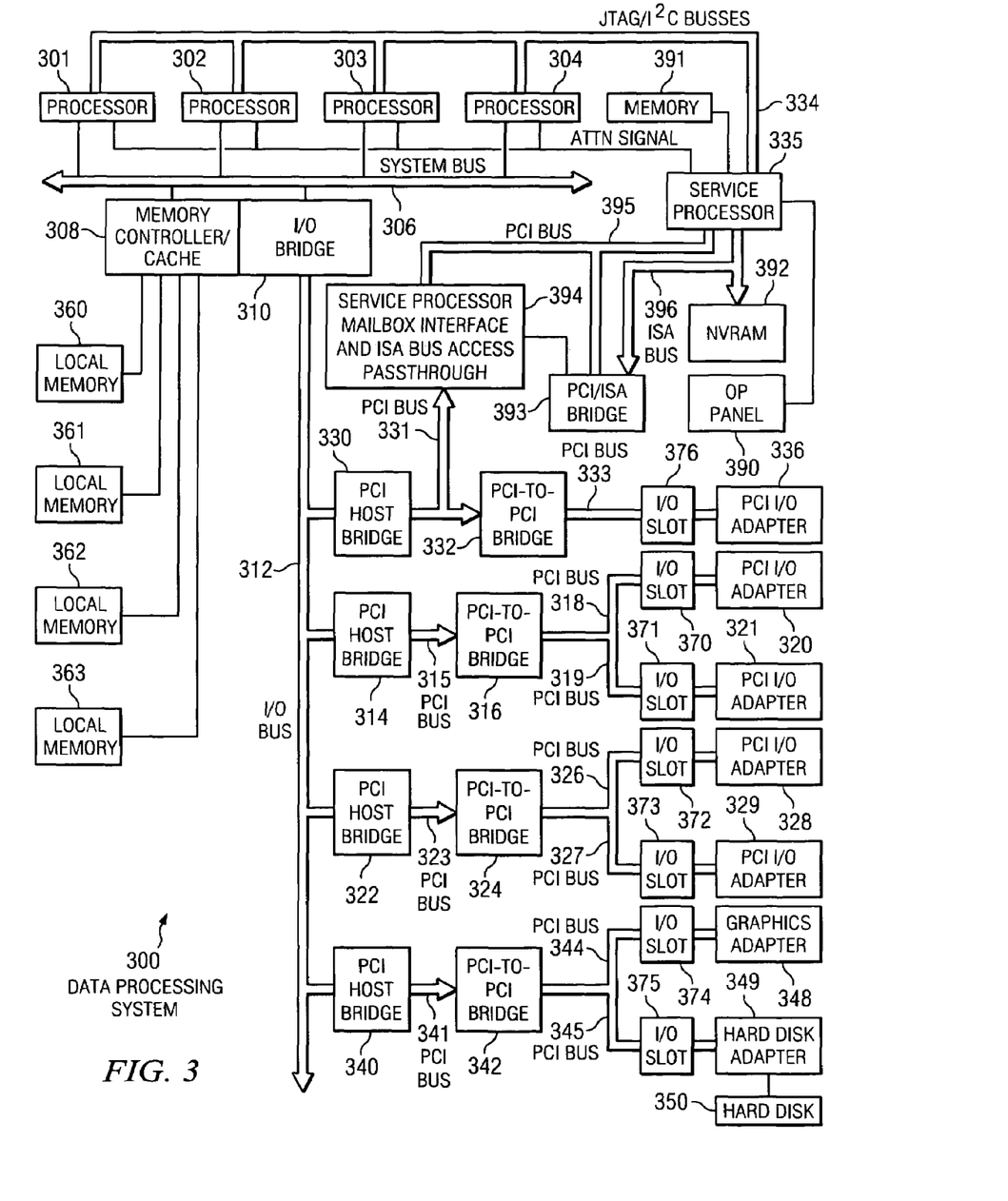
FIG. 3 is a block diagram of a data processing system in which the present invention may be implemented.

With reference to FIG. 3, a block diagram of a data processing system in which the present invention may be implemented is depicted. Data processing system 300 may be a symmetric multiprocessor (SMP) system including a plurality of processors 301, 302, 303, and 304, which connect to system bus 306. For example, data processing system 300 may be an IBM eserver, a product of International Business Machines Corporation in Armonk, New York, implemented as a server within a network. Alternatively, a single processor system may be employed. Also connected to system bus 306 is memory controller/cache 308, which provides an interface to a plurality of local memories 360-363. I/O bridge 310 connects to system bus 306 and provides an interface to I/O bus 312. Memory controller/cache 308 and I/O bridge 310 may be integrated as depicted.

Data processing system 300 is a logical partitioned (LPAR) data processing system. Thus, data processing system 300 may have multiple heterogeneous operating systems (or multiple instances of a single operating system) running simultaneously. Each of these multiple operating systems may have any number of software programs executing within it. Data processing system 300 is logically partitioned such that different PCI I/O adapters 320-321, 328-329, and 336, graphics adapter 348, and hard disk adapter 349 may be assigned to different logical partitions. In this case, graphics adapter 348 connects for a display device (not shown), while hard disk adapter 349 connects to and controls hard disk 350.

Thus, for example, suppose data processing system 300 is divided into three logical partitions, P1, P2, and P3. Each of PCI I/O adapters 320-321, 328-329, 336, graphics adapter 348, hard disk adapter 349, each of host processors 301-304, and memory from local memories 360-363 is assigned to each of the three partitions. In these examples, local memories 360-363 may take the form of dual in-line memory modules (DIMMs). DIMMs are not normally assigned on a per DIMM basis to partitions. Instead, a partition will get a portion of the overall memory seen by the platform. For example, processor 301, some portion of memory from local memories 360-363, and I/O adapters 320, 328, and 329 may be assigned to logical partition P1; processors 302-303, some portion of memory from local memories 360-363, and PCI I/O adapters 321 and 336 may be assigned to partition P2; and processor 304, some portion of memory from local memories 360-363, graphics adapter 348 and hard disk adapter 349 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 314 connected to I/O bus 312 provides an interface to PCI local bus 315. A number of PCI input/output adapters 320-321 connect to PCI bus 315 through PCI-to-PCI bridge 316, PCI bus 318, PCI bus 319, I/O slot 370, and I/O slot 371. PCI-to-PCI bridge 316 provides an interface to PCI bus 318 and PCI bus 319. PCI I/O adapters 320 and 321 are placed into I/O slots 370 and 371, respectively. Typical PCI bus implementations support between four and eight I/O adapters (i.e. expansion slots for add-in connectors). Each PCI I/O adapters 320-321 provides an interface between data processing system 300 and input/output devices such as, for example, other network computers, which are clients to data processing system 300.

An additional PCI host bridge 322 provides an interface for an additional PCI bus 323. PCI bus 323 connects to a plurality of PCI I/O adapters 328-329. PCI I/O adapters 328-329 connect to PCI bus 323 through PCI-to-PCI bridge 324, PCI bus 326, PCI bus 327, I/O slot 372, and I/O slot 373. PCI-to-PCI bridge 324 provides an interface to PCI bus 326 and PCI bus 327. PCI I/O adapters 328 and 329 are placed into I/O slots 372 and 373, respectively. In this manner, additional I/O devices, such as, for example, modems or network adapters may be supported through each of PCI I/O adapters 328-329. Consequently, data processing system 300 allows connections to multiple network computers.

Memory mapped graphics adapter 348 is inserted into I/O slot 374 and connects to I/O bus 312 through PCI bus 344, PCI-to-PCI bridge 342, PCI bus 341, and PCI host bridge 340. Hard disk adapter 349 may be placed into I/O slot 375, which connects to PCI bus 345. In turn, this bus connects to PCI-to-PCI bridge 342, which connects to PCI host bridge 340 by PCI bus 341.

PCI host bridge 330 provides an interface for PCI bus 331 to connect to I/O bus 312. PCI I/O adapter 336 connects to I/O slot 376, which connects to PCI-to-PCI bridge 332 by PCI bus 333. PCI-to-PCI bridge 332 connects to PCI bus 331. This PCI bus also connects PCI host bridge 330 to the service processor mailbox interface and ISA bus access pass-through logic 394 and PCI-to-PCI bridge 332. Service processor mailbox interface and ISA bus access pass-through logic 394 forwards PCI accesses destined to PCI/ISA bridge 393. NVRAM storage 392 connects to ISA bus 396. Service processor 335 connects to service processor mailbox interface and ISA bus access pass-through logic 394 through its local PCI bus 395. Service processor 335 also connects to processors 301-304 via a plurality of JTAG/I$^2$C busses 334. JTAG/I$^2$C busses 334 are a combination of JTAG/scan busses (see IEEE 1149.1) and Phillips I$^2$C busses. However, alternatively, JTAG/I$^2$C busses 334 may be replaced by only Phillips I$^2$C busses or only JTAG/scan busses. All SP-ATTN signals of host processors 301, 302, 303, and 304 connect together to an interrupt input signal of service processor 335. Service processor 335 has its own local memory 391 and has access to hardware OP-panel 390.

When data processing system 300 is initially powered up, service processor 335 uses JTAG/I$^2$C busses 334 to interrogate system (host) processors 301-304, memory controller/cache 308, and I/O bridge 310. At the completion of this step, service processor 335 has an inventory and topology understanding of data processing system 300. Service processor 335 also executes Built-In-Self-Tests (BISTs), Basic Assurance Tests (BATs), and memory tests on all elements found by interrogating host processors 301-304, memory controller/cache 308, and I/O bridge 310. Any error information for failures detected during the BISTs, BATs, and memory tests are gathered and reported by service processor 335.

If a meaningful/valid configuration of system resources is still possible after taking out the elements found to be faulty during the BISTs, BATs, and memory tests, then data processing system 300 is allowed to proceed to load executable code into local (host) memories 360-363. Service processor 335 then releases host processors 301-304 for execution of the code loaded into local memories 360-363. While host processors 301-304 are executing code from respective operating systems within data processing system 300, service processor 335 enters a mode of monitoring and reporting errors. The type of items monitored by service processor 335 include, for example, the cooling fan speed and operation, thermal sensors, power supply regulators, and recoverable and non-recoverable errors reported by processors 301-304, local memories 360-363, and I/O bridge 310.

Service processor 335 saves and reports error information related to all the monitored items in data processing system 300. Service processor 335 also takes action based on the type of errors and defined thresholds. For example, service processor 335 may take note of excessive recoverable errors on a processor's cache memory and decide that this is predictive of a hard failure. Based on this determination, service processor 335 may mark that resource for deconfiguration during the current running session and future Initial Program Loads (IPLs). IPLs are also sometimes referred to as a "boot" or "bootstrap".

Data processing system 300 may be implemented using various commercially available computer systems. For example, data processing system 300 may be implemented using IBM eserver iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
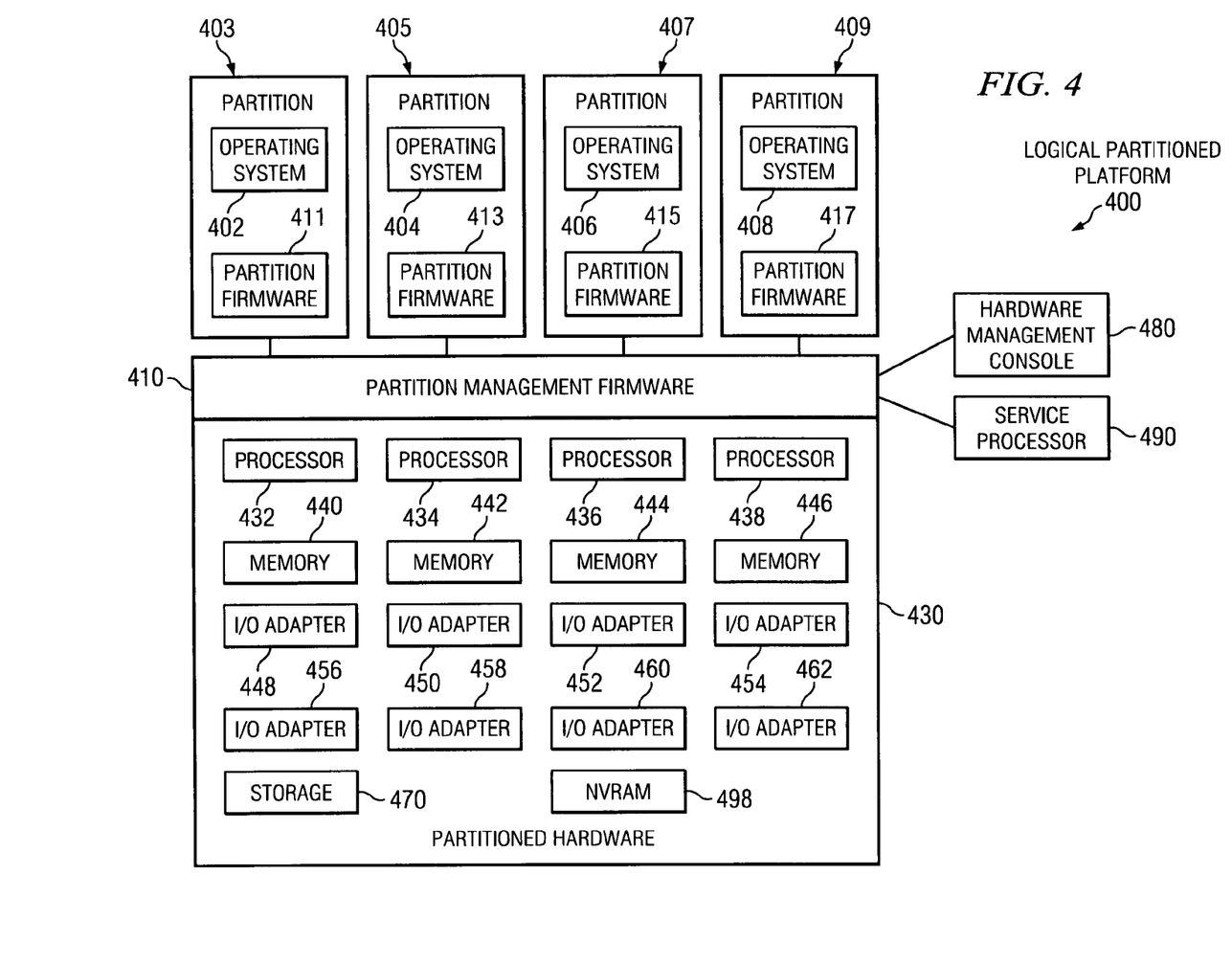
FIG. 4 is a block diagram of an exemplary logical partitioned platform in which the present invention may be implemented.

With reference now to FIG. 4, a block diagram of an exemplary logical partitioned platform is depicted in which the present invention may be implemented. The hardware in logical partitioned platform 400 may be implemented as, for example, data processing system 300 in FIG. 3. Logical partitioned platform 400 includes partitioned hardware 430, operating systems 402, 404, 406, 408, and partition management firmware 410. Operating systems 402, 404, 406, and 408 may be multiple copies of a single operating system or multiple heterogeneous operating systems simultaneously run on logical partitioned platform 400. These operating systems may be implemented using OS/400, which are designed to interface with a partition management firmware, such as Hypervisor. OS/400 is used only as an example in these illustrative embodiments.

Of course, other types of operating systems, such as AIX and Linux, may be used depending on the particular implementation. Operating systems 402, 404, 406, and 408 are located in partitions 403, 405, 407, and 409. Hypervisor software is an example of software that may be used to implement partition management firmware 410 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 411, 413, 415, and 417. Partition firmware 411, 413, 415, and 417 may be implemented using initial boot strap code, IEEE-1275 Standard Open Firmware, and runtime abstraction software (RTAS), which is available from International Business Machines Corporation. When partitions 403, 405, 407, and 409 are instantiated, a copy of boot strap code is loaded onto partitions 403, 405, 407, and 409 by partition management firmware 410. Thereafter, control is transferred to the boot strap code with the boot strap code then loading the open firmware and RTAS. The processors associated or assigned to the partitions are then dispatched to the partition's memory to execute the partition firmware.

Partitioned hardware 430 includes a plurality of processors 432-438, a plurality of system memory units 440-446, a plurality of input/output (I/O) adapters 448-462, and storage unit 470. Each of processors 432-438, memory units 440-446, NVRAM storage 498, and I/O adapters 448-462 may be assigned to one of multiple partitions within logical partitioned platform 400, each of which corresponds to one of operating systems 402, 404, 406, and 408.

Partition management firmware 410 performs a number of functions and services for partitions 403, 405, 407, and 409 to create and enforce the partitioning of logical partitioned platform 400. Partition management firmware 410 is a firmware implemented virtual machine identical to the underlying hardware. Thus, partition management firmware 410 allows the simultaneous execution of independent operating system images 402, 404, 406, and 408 by virtualizing all the hardware resources of logical partitioned platform 400.

Service processor 490 may be used to provide various services, such as processing of platform errors in the partitions. These services also may act as a service agent to report errors back to a vendor, such as International Business Machines Corporation. Operations of the different partitions may be controlled through a hardware management console, such as hardware management console 480. Hardware management console 480 is a separate data processing system from which a system administrator may perform various functions including reallocation of resources to different partitions.

The aspects of the present invention provide a computer implemented method, apparatus, and computer usable program code for centrally configuring and managing client data processing systems. In particular, the aspects of the present invention use a network server to dispense uniform configurations to dynamically customizable computer systems that require configuration information to function. This uniform configuration defines everything for a client including, for example, hardware resources physical and virtual and other operating system specific configuration details, such as IP configuration. In the illustrative examples, the network server is employed to alleviate the complexity of managing systems by unifying the configuration and making the configuration distributable to the network. In this manner, the client is automatically configured with the appropriate hardware, operating systems, and system specific applications and configuration information.

Figure 5:
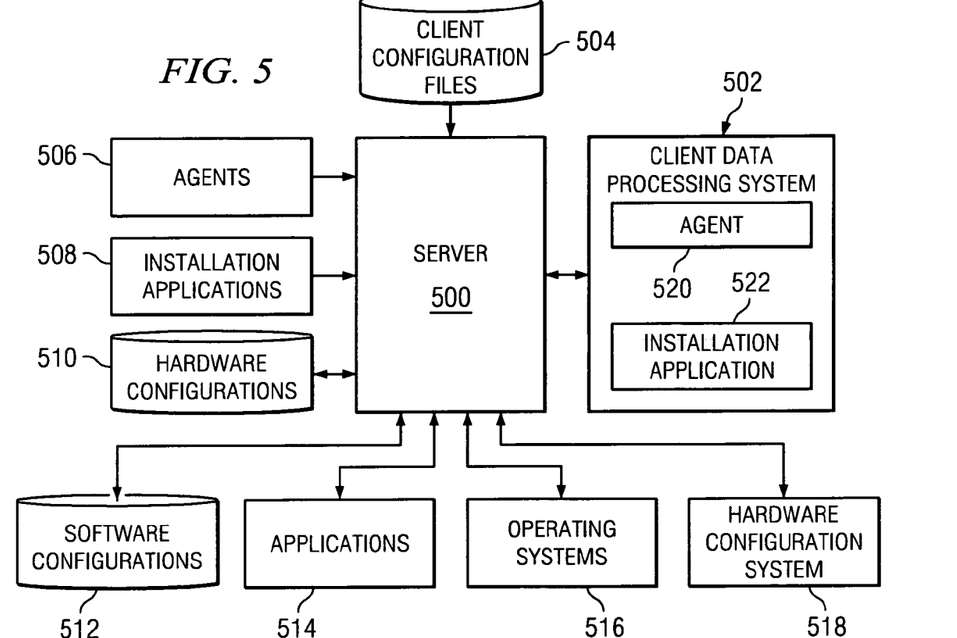
FIG. 5 is a diagram illustrating components used in configuring clients in accordance with an illustrative embodiment of the present invention.

Turning now to FIG. 5, a diagram illustrating components used in configuring clients is depicted in accordance with an illustrative embodiment of the present invention. In this example, server 500 is employed to configure client data processing system 502. In this example, server 500 may be implemented using data processing system 200 in FIG. 2.

Client data processing system 502 may be implemented using data processing system 300 in FIG. 3. Server 500 contains a number of resources used to perform hardware and software configuration for client data processing system 502. These resources include client configuration files 504, agents 506, installation applications 508, hardware configurations database 510, software configurations database 512, applications 514, and operating systems 516. The actual hardware configuration of client data processing system 502 is performed using hardware configuration system 518.

When a user desires to configure a data processing system, the particular configuration for a data processing system, such a client data processing system 502 may be specified in a profile or other file in client configuration files database 504. These client configuration files specify the particular hardware, operating system, and software configuration for client data processing system 502. These client configuration files may be specifically defined for the processing system or standardized configuration files may be setup for data processing systems having minimal resources. A user may select a client configuration file from client configuration files database 504 or may create one within client configuration files database 504 for use by server 500 to configure client data processing system 502.

When a particular client configuration file from client configuration files database 504 is selected, server 500 initiates hardware configuration using a hardware configuration file from hardware configuration database 510. The information in this database is used to specify hardware that is to be included in client data processing system 502 in this example. This specification of hardware may be used to configure the hardware in client data processing system 502 in a number of different ways.

For example, this information may be sent to hardware configuration system 518 to have the hardware for client data processing system 502 setup from a pool of available hardware resources. Hardware configurations system 518 may be, for example, a computer assembly plant located remotely from server 500. The information sent to this assembly plant causes a data processing system to be assembled with the hardware specified in the hardware configuration file from hardware configurations database 510 to form client data processing system 502. Such an implementation is useful when existing systems do not exist. If client data processing system 502 is an existing data processing system, the hardware configuration information from hardware configurations database 510 may be sent to hardware configuration system 518 to configure this hardware for use, such as setting up logical partitions. With this type of implementation, the hardware configuration involves partitioning or assigning hardware within client data processing system 502 to different partitions. In this type of implementation, hardware configuration system 518 contains the hardware and software necessary to perform operations normally performed by hardware management console. In this manner, hardware configuration system 518 communicates with client data processing system 502 to assign hardware to different partitions.

In this type of implementation, hardware configuration system 518 may be connected to or part of server 500 or may be located remotely from this data processing system.

The hardware configuration of client data processing system 502 also involves modifying this client data processing system to load agent 520 from agents 506 upon initialization of client data processing system 502. For example, a bootstrap protocol (BOOTP) allows a host to load a file when the system is booted. In these examples, the file is for client data processing system 502. Agent 520 is retrieved from server 500, which maintains agents 506 for downloading to client data processing systems. Depending on the particular implementation, agent 520 may be located on a local storage device in client data processing system 502. If retrieved from server 500, agent 520 may be transferred using trivial file transfer protocol (TFTP).

In these depicted examples, agent 520 is a small file, such as 10 megabytes. Agent 520 contains the code necessary to establish an environment to download an installation application from installation application 522 on server 500. This environment provided by agent 520 includes a basic operating system with sufficient devices to allow the retrieval of installation application 522 and to allow this application to retrieve other files and install and configure those files on client data processing system 502. Agent 520 establishes the operating environment for installation application 522 to perform the configuration of the operating system and applications for client data processing system 502. Agent 520 contains an operating system kernel binary image and several devices drivers. These components represent the minimal set of software needed to boot the operating system to be installed. The agent also may include any other instructions needed. In these illustrative examples, agent 520 also includes instructions to configure the environment needed to perform a network installation. Alternatively, agent 520 also may be used to boot the machine as a thin client. In this type of implementation, the client is booted with a network operating system with no such installation residing on the disk.

In these examples, only a single agent and installation application are shown. If client data processing system 502 takes the form of a logical partitioned data processing system, an agent is downloaded for each of the partitions. Additionally, each agent downloads an installation application. The agent downloaded for each partition may vary depending on the operating system that is to run on the particular partition.

Installation application 522 is downloaded onto client data processing system 502. Once installation application 522 is executing on client data processing system 502, server 500 directs the downloading of files to client data processing system 502 using installation application 522. The particular files downloaded are specified by client configuration files database 504. Server 500 selects the appropriate operating systems, applications, and configurations for the software using the client configuration file. In these examples, these files may be located on server 500 or on a data processing system acceptable by server 500.

Installation application 522 receives operating system files from operating systems database 516. These operating system files are used by operating systems database 516 to install an operating system on client data processing system 502. In the event that client data processing system 502 is a logical partitioned data processing system, installation application 522 installs the operating system designated for the partition on which this application executes. Other installation applications execute on the other partitions and download operating system files for the particular operating system designated for those partitions.

After the operating system has been installed, installation application 522 receives application files from applications database 514. These application files are used to install the software applications for client data processing system 502. The particular application for use on this system is designated in the client configuration file for client data processing system 502. After the applications have been installed, installation application 522 receives a software configuration file from software configurations database 512. The information in this configuration file is used to configure the software on client data processing system 502. The configuring of software includes, for example, changing any settings needed for the operating system and different applications installed on client data processing system 502. For example, a default or primary language for use in an operating system may be changed depending on the specifications in client configuration files 504. These particular changes are designated in the software configuration information received from server 500.

After the configuration is completed, installation application 522 sends a report to server 500 detailing the actions taken and the success of the actions. Further, during the installation and configuration of client data processing system 502, installation application 522 may send updates and other status information to server 500. In this manner, an administrator may connect to server 500 and view the current status of client data processing system 502 during its configuration.

This particular process used to configure client data processing system 502 may be used to configure any data processing system with configurable hardware in a network. Further, this configuration may occur concurrently with the configuration of other client data processing systems. This system does not send entire images to the client data processing system. As a result, a customized image for each particular data processing system is now required. Instead, the different files are combined and the configurations are selected based on the client configuration files defined by an administrator or user. In configuring a particular client data processing system, an administrator may select a previously defined client configuration file. The administrator locates a client configuration file matching the hardware resources on the client data processing system. This process may be used when a user is seeking to configure an already assembled client data processing system.

Figure 6:
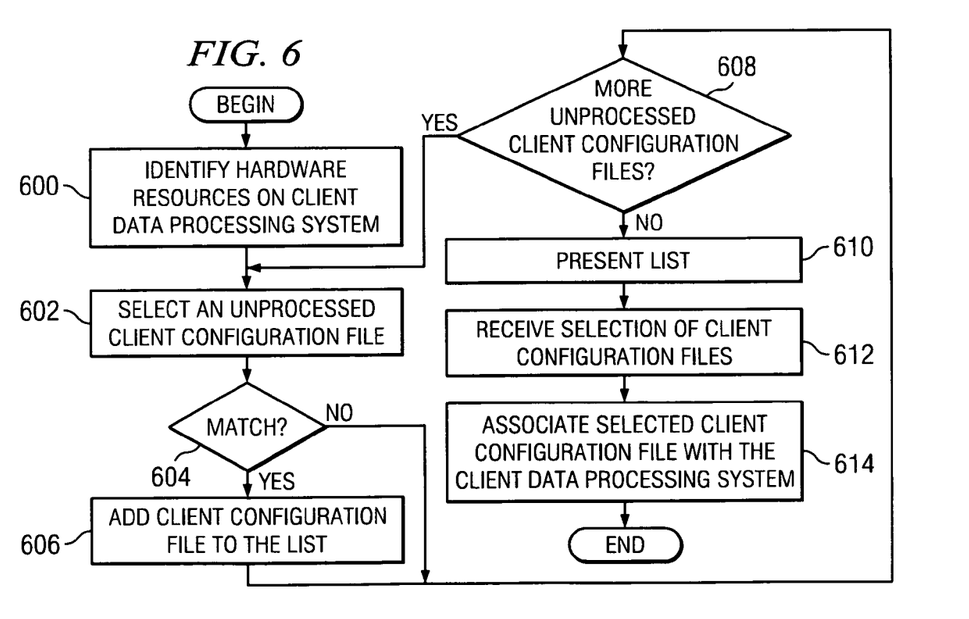
FIG. 6 is a flowchart of a process for selecting a client configuration file for a client data processing system in accordance with an illustrative embodiment of the present invention.

Turning now to FIG. 6, a flowchart of a process for selecting a client configuration file for a client data processing system is depicted in accordance with an illustrative embodiment of the present invention. The process illustrated in FIG. 6 may be implemented in a server, such as server 500 in FIG. 5. Server 500 is a process executing on a data processing system in these examples.

The process begins by identifying hardware resources on the client data processing system (step 600). This step may be implemented in a number of different ways. For example, a system administrator or other user may enter the hardware resources present on the data processing system. Alternatively, an agent or process on the client data processing system may interrogate the data processing system to identify hardware present and return that information to the server. Next, the process selects a client configuration file (step 602). A determination is made as to whether a match is present between the hardware identified on the client data processing system and the client configuration files (step 604). If a match is present, the client configuration file is added to a list of client configuration files (step 606).

This search in steps 602, 604, and 606 identifies any client configuration files that can be used for the particular client data processing system. As a result, a client configuration that requires less hardware resources than is present on the client data processing system may be used. For example, if the particular client data processing system contains 8 processors and a client configuration file using 6 processors is present, that client configuration file is identified as one that may be used to configure the client data processing system.

Thereafter, a determination is made as to whether additional unprocessed client configuration files are present (step 608). If additional unprocessed client configuration files are present, the process returns to step 602. Otherwise, the process presents the list of identified client configuration files (step 610). A selection of the presented list of client configuration files is received (step 612). The selected client configuration file is associated with the client data processing system (step 614) with the process terminating thereafter.

The process also proceeds to step 608 to determine whether additional unprocessed client configuration files are present if a match is not present in step 604. This process allows a user to select client configuration files from a set or database of client configuration files that can be used to configure the particular client data processing system. Alternatively, a user may define the particular configurations desired for the client data processing system. With this definition, the aspects of the present invention centrally manage the configuration of the client data processing system without requiring additional user intervention.

In this manner, a user is not required to be physically present at the client data processing system or use a hardware management console to configure the client data processing system. Thus, the user avoids having to watch each and oversee every installation and configuration of resources on the client data processing system.

Figure 7:
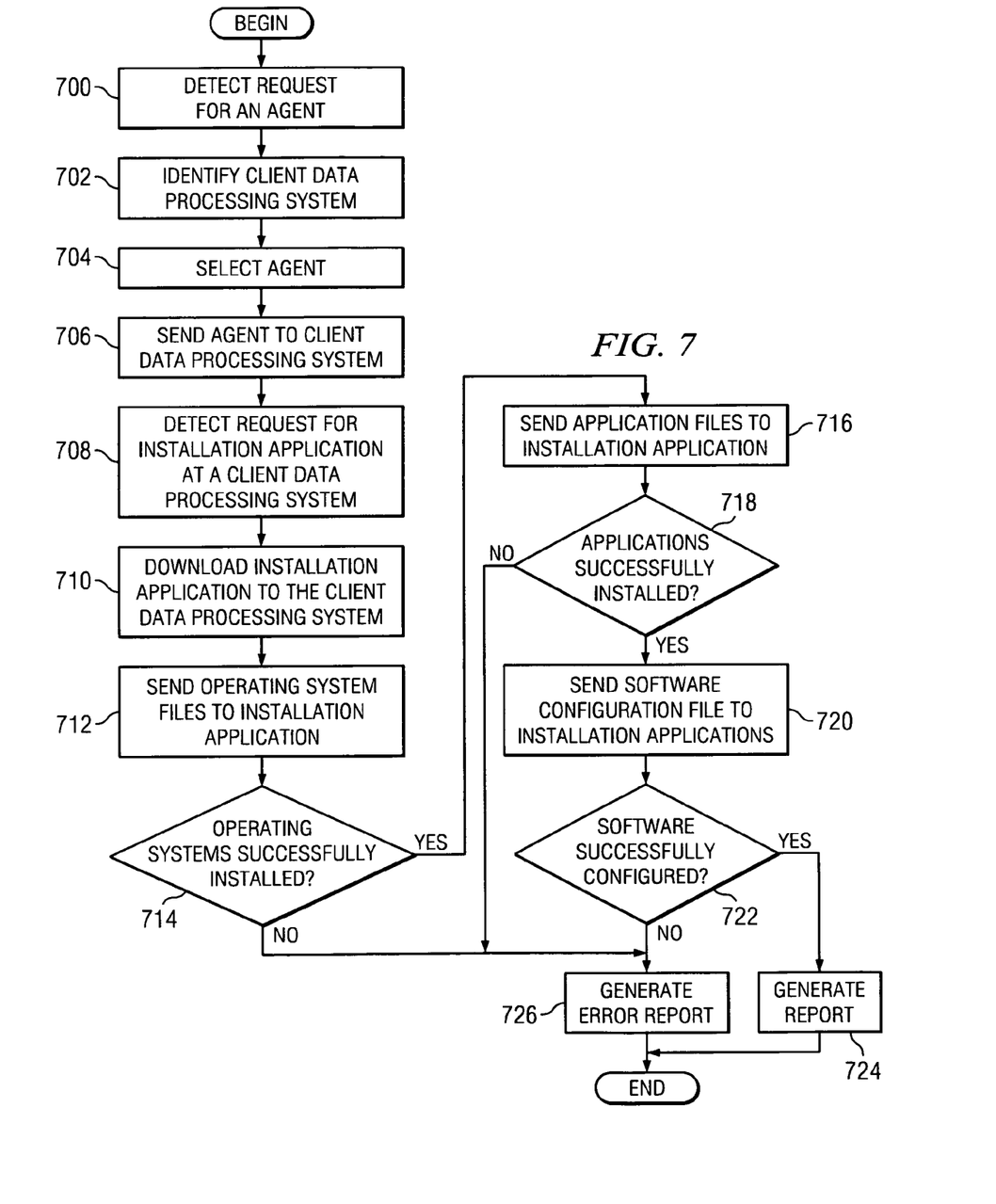
FIG. 7 is a flowchart of a process for configuring a client data processing system in accordance with an illustrative embodiment of the present invention.

Turning now to FIG. 7, a flowchart of a process for configuring a client data processing system is depicted in accordance with an illustrative embodiment of the present invention. The process illustrated in FIG. 7 may be implemented in a server process, such as server 500 in FIG. 5.

The process begins by detecting a request for an agent (step 700). This request is generated by a data processing system when it first initializes. The agent is used to setup an environment to allow for software installation and configuration on the client data processing system. The client data processing system configuration is identified (step 702). In these examples, the client is identified by either its IP address. Alternatively, the client data processing system may be identified based upon the hardware address as identified in the BOOTP protocol. An agent is then selected from a set of agents (step 704). The particular agent depends on the operating system to be installed on the client data processing system in these examples. The agent is then sent to the client data processing system (step 706). This agent is sent using a trivial file transfer protocol in these examples. Thereafter, the process detects a request for an installation application of the client data processing system (step 708). Next, an installation application is downloaded to the client data processing system (step 710).

Thereafter, operating system files are sent to the installation applications (step 712). These operating system files may be for one of more operating systems depending on the configuration for the client data processing system. The particular operating system files selected depend on the designation made in the client configuration file. Next, a determination is made as to whether the operating systems have been successfully installed on the client data processing system (step 714). If the operating systems have been successfully installed, application files are sent to the installation application (step 716).

A determination is made as to whether the applications have been successfully installed (step 718). If the applications have been successfully installed, a software configuration file is sent to the installation application to configure the software and other settings (step 720). A determination is then made as to whether the software has been successfully configured (step 722). If the software has been successfully configured, a report is generated detailing the different configurations made (step 724) with the process terminating thereafter.

With reference again to steps 714, 718, and 722, if at any point an unsuccessful installation or configuration occurs, an error report is generated (step 726) with the process terminating thereafter.

Figure 8:
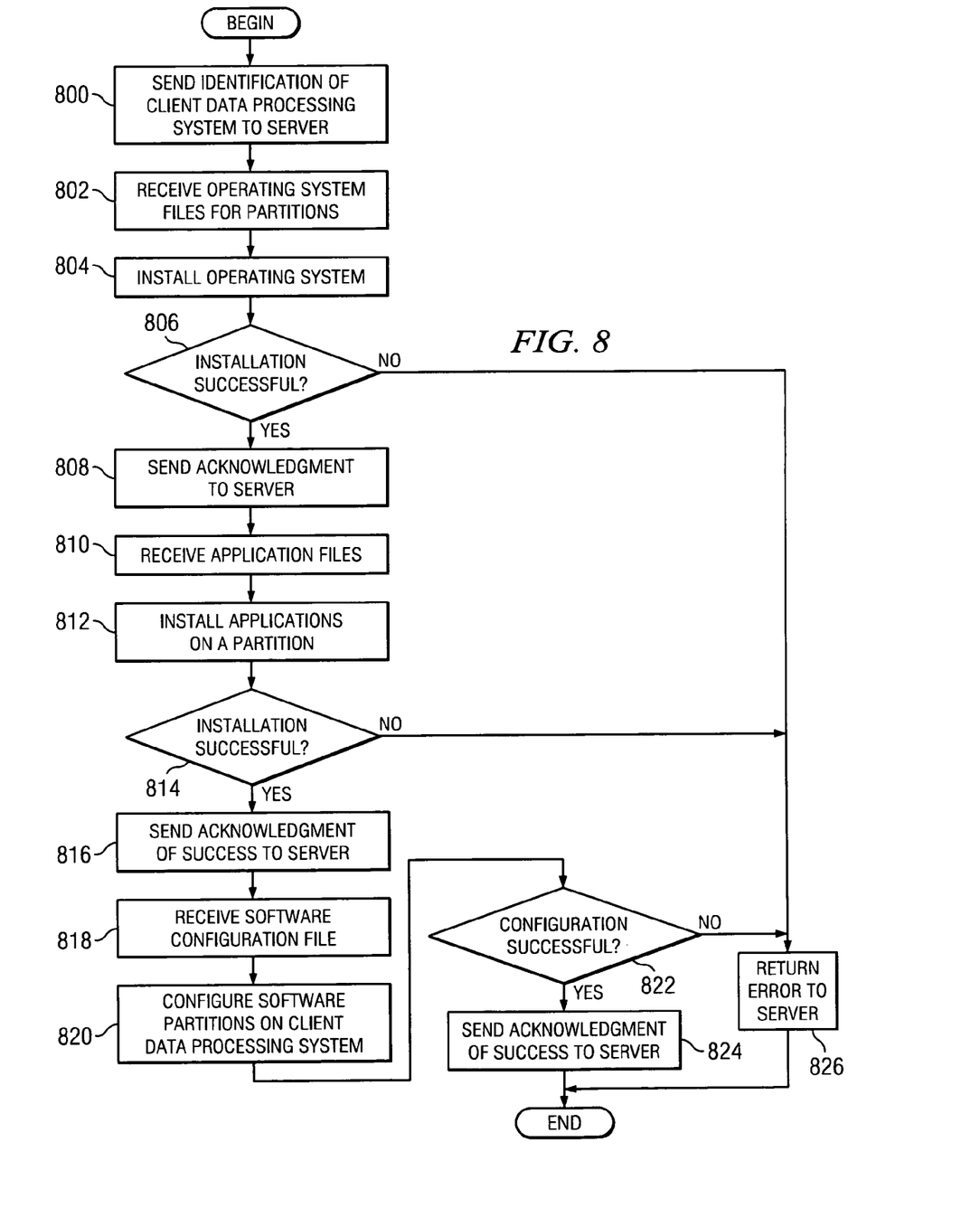
FIG. 8 is a flowchart of a process for configuring a client data processing system in accordance with an illustrative embodiment of the present invention.

Turning to FIG. 8, a flowchart of a process for configuring a client data processing system is depicted in accordance with an illustrative embodiment of the present invention. The process illustrated in FIG. 8 may be implemented in an installation application, such as installation application 522 in FIG. 5. If the data processing system is a logically partitioned data processing system, each partition has an instance of the installation application to configure the particular operating system and applications for that partition.

The process begins by sending an identification of the client data processing system to the server (step 800). Thereafter, operating system files are received for the partitions (step 802). An operating system is installed on the client data processing system (step 804). Next, a determination is made as to whether the operating systems have been successfully installed (step 806). If the installation of the operating systems was successful, the process sends an acknowledgement of the success to the server (step 808).

Afterwards, the process receives application files from the server (step 810). The process then installs applications on a partition (step 812). A determination is made as to whether the application installations were successful (step 814). If the installations were successful, an acknowledgement of the success is sent to the server (step 816) and a software configuration file is received (step 818). Thereafter, the software is configured on the partition on the client data processing systems (step 820). This configuration for the partition may include changes, such as those to the operating system and/or applications installed for the partition. Then, a determination is made as to whether the configuration of the software on the client data processing system is successful (step 822). If the configuration is successful, an acknowledgment of the success is sent to the server (step 824) with the process terminating thereafter. In these illustrative examples, the software configuration is a software customization. The software configuration may customize or change default settings present in the operating system or in applications. For example, if a Web server application is installed in step 812, a user may desire to feed a pre-arranged configuration to this application so that the Web server application performs the intended function following the requirements for this particular client system.

As another example, if an operating system installed in step 804 has a primary user interface that is English, the software configuration file may require the user interface to be run in Spanish. As a result, a software customization is initialized in step 826 to make this change to the operating system. As another example, if an installed operating system has network interfaces other than one that is used to perform the network installation, then the system may be configured with selected TCP/IP settings.

With reference again to steps 806, 814, and 822, if any of the configurations or installations are unsuccessful, an error is returned to the server (step 826) with the process terminating thereafter.

Thus, the aspects of the present invention provide an improved computer implemented method, apparatus, and computer usable program code for configuring client data processing systems. The aspects of the present invention provide an ability to configure client data processing systems from a centralized location. The different processes of the present invention avoid needing a user to be physically present at the client data processing system. Additionally, the user is not required to configure install resources on the client data processing system. Further, the aspects of the present invention allow for a single point to manage and configure multiple client data processing systems simultaneously.

The depicted examples illustrate the configuration of a client data processing system in which multiple logical partitions are present. The different aspects of the present invention may be applied to other types of data processing systems other than just logical partitioned data processing systems. For example, the different aspects of the present invention may be used in conjunction with prefabricated data processing systems with preconfigured customizable options such as hardware type, architecture, operating system type, and software. As a result, a data processing system that is not partitioned may use logical partitioned data processing systems. In this manner, the aspects of the present invention provide for customizing many different types of data processing systems in terms of hardware and software.

Additionally, the aspects of the present invention may be provided as a service to customers. As a service, the service provider may send hardware configuration information to hardware configurations system to configure a client data processing system for a customer. Service provider then sends the installation to the client data processing system and completes the configuration of the client data processing system based on a configuration selected or defined by the customer. The initiation of the sending of the installation application occurs when the customer connects the client data processing system to a network and turns on the client data processing system. The service provider may provide this type of service for a fee or as part of a sale or maintenance agreement with the customer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for configuring a remote data processing system, wherein the computer implemented method is implemented in a server data processing system, the computer implemented method comprising:

identifying a configuration for the remote data processing system to form an identified configuration, and wherein identifying comprises receiving a selection of the configuration from a plurality of configurations;

selecting hardware configuration information based on the identified configuration to form selected hardware configuration information;

sending the selected hardware configuration information across a communications link to an installation application executing on the data processing system based on the identified configuration, wherein the installation application configures hardware resources on the data processing system to form a set of partitions using the selected hardware configuration information;

selecting operating system files for the remote data processing system based on the identified configuration to form selected operating system files;

sending the selected operating system files to the installation application executing on the data processing system, wherein the installation application configures a set of operating systems for a set of partitions on the data processing system using the selected operating system files;

selecting application files based on the identified configuration to form selected application files;

sending the selected application files to the installation application executing on the data processing system, wherein the installation application installs applications on the data processing system using the selected application files;

selecting software configuration information based on the identified configuration to form selected software configuration information;

sending the selected software configuration information to the installation application, executing on the data processing system, wherein the installation application configures software on the data processing system using the selected software configuration information to form a configured data processing system, wherein the configured data processing system is configured as a logical partitioned data processing system;

receiving a request through the communications link for the installation application from an agent on the data processing system; and sending the installation application to the remote data processing system across the communications link.

2. A computer readable storage medium storing a computer implemented method for configuring a remote data processing system, wherein the computer implemented method is implemented in a server data processing system, the computer readable storage medium comprising:

instructions for identifying a configuration for the remote data processing system to form an identified configuration, and wherein identifying comprises receiving a selection of the configuration from a plurality of configurations;

instructions for selecting hardware configuration information based on the identified configuration to form selected hardware configuration information;

instructions for sending the selected hardware configuration information across a communications link to an installation application executing on the data processing system based on the identified configuration, wherein the installation application configures hardware resources on the data processing system to form a set of partitions using the selected hardware configuration information;

instructions for selecting operating system files for the remote data processing system based on the identified configuration to form selected operating system files;

instructions for sending the selected operating system files to the installation application executing on the data processing system, wherein the installation application configures a set of operating systems for a set of partitions on the data processing system using the selected operating system files;

instructions for selecting application files based on the identified configuration to form selected application files;

instructions for sending the selected application files to the installation application executing on the data processing system, wherein the installation application installs applications on the data processing system using the selected application files;

instructions for selecting software configuration information based on the identified configuration to form selected software configuration information;

instructions for sending the selected software configuration information to the installation application, executing on the data processing system, wherein the installation application configures software on the data processing system using the selected software configuration information to form a configured data processing system, wherein the configured data processing system is configured as a logical partitioned data processing system;

instructions for receiving a request through the communications link for the installation application from an agent on the data processing system; and instructions for sending the installation application to the remote data processing system across the communications link.

3. A server data processing system comprising:

a bus;

a processor connected to the bus;

a memory connected the bus, wherein the memory contains a set of instructions for configuring a remote data processing system, wherein the processor is capable of executing the set of instructions to:

identify a configuration for the remote data processing system to form an identified configuration, and wherein identifying comprises receiving a selection of the configuration from a plurality of configurations;

select hardware configuration information based on the identified configuration to form selected hardware configuration information;

send the selected hardware configuration information across a communications link to an installation application executing on the data processing system based on the identified configuration, wherein the installation application configures hardware resources on the data processing system to form a set of partitions using the selected hardware configuration information;

select operating system files for the remote data processing system based on the identified configuration to form selected operating system files;

send the selected operating system files to the installation application executing on the data processing system, wherein the installation application configures a set of operating systems for a set of partitions on the data processing system using the selected operating system files;

select application files based on the identified configuration to form selected application files;

send the selected application files to the installation application executing on the data processing system, wherein the installation application installs applications on the data processing system using the selected application files;

select software configuration information based on the identified configuration to form selected software configuration information;

send the selected software configuration information to the installation application, executing on the data processing system, wherein the installation application configures software on the data processing system using the selected software configuration information to form a configured data processing system, wherein the configured data processing system is configured as a logical partitioned data processing system;

receive a request through the communications link for the installation application from an agent on the data processing system; and send the installation application to the remote data processing system across the communications link.

* * * * *